United States Patent
Dong et al.

(10) Patent No.: US 12,378,451 B2
(45) Date of Patent: Aug. 5, 2025

(54) LOW-VISCOSITY SILANE-TERMINATED RESIN FOR SEALANT AND PREPARATION METHOD THEREOF

(71) Applicants: Zhejiang Huangma Technology Co., Ltd., Zhejiang (CN); Zhejiang Huangma Shangyi New Material Co., Ltd., Zhejiang (CN); Zhejiang Lukean Chemical Co., Ltd., Zhejiang (CN); Shangyu Huangma Surface Activated Reagent Research Institute Co., Ltd., Zhejiang (CN)

(72) Inventors: Nan Dong, Zhejiang (CN); Yifeng Jin, Zhejiang (CN); Weisong Wang, Zhejiang (CN); Majishi Wang, Zhejiang (CN)

(73) Assignees: Zhejiang Huangma Technology Co., Ltd., Shaoxing (CN); Zhejiang Huangma Shangyi New Material Co., Ltd., Shaoxing (CN); Zhejiang Lukean Chemical Co., Ltd., Shaoxing (CN); Shangyu Huangma Surface Activated Reagent Research Institute Co., Ltd., Shaoxing (CN)

( * ) Notice: Subject to any disclaimer, the term of this patent is extended or adjusted under 35 U.S.C. 154(b) by 11 days.

(21) Appl. No.: 18/374,667

(22) Filed: Sep. 29, 2023

(65) Prior Publication Data

US 2024/0384143 A1  Nov. 21, 2024

(30) Foreign Application Priority Data

May 17, 2023 (CN) .......................... 202310555315.1

(51) Int. Cl.
*C09J 163/00* (2006.01)
*C08G 59/14* (2006.01)

(52) U.S. Cl.
CPC ........ *C09J 163/00* (2013.01); *C08G 59/1477* (2013.01)

(58) Field of Classification Search
CPC ..................... C09J 163/00; C08G 59/1477
(Continued)

(56) References Cited

FOREIGN PATENT DOCUMENTS

| CN | 1037041 A | 11/1989 |
| CN | 103080175 A | 5/2013 |

(Continued)

OTHER PUBLICATIONS

Notice of Allowance of counterpart Chinese Patent Application No. 202310555315.1 issued on Feb. 8, 2024.
(Continued)

*Primary Examiner* — David T Karst

(57) ABSTRACT

The present application discloses a low-viscosity silane-terminated resin for a sealant and a preparation method thereof, and belongs to the technical field of sealants. The present application firstly uses an alcohol initiator, an alkali earth metal and epoxy alkane to synthesize a low-molecular-weight polymer, then adds a polymetallic cyanide catalyst and the epoxy alkane to synthesize a high-molecular-weight polymer, and finally adds carboxylate metal and isocyanate silane to react to obtain the silane-terminated resin. A short chain segment is successfully introduced into a molecule, and an original molecular crystal is destroyed, to achieve intramolecular plasticization, so that its molecular chain becomes flexible and is easy to move, thus the purpose of reducing viscosity is achieved.

8 Claims, 8 Drawing Sheets

(58) Field of Classification Search
USPC .......................................................... 525/528
See application file for complete search history.

(56) References Cited

FOREIGN PATENT DOCUMENTS

| | | |
|---|---|---|
| CN | 104212046 A | 12/2014 |
| CN | 110591080 A | 12/2019 |
| CN | 111057214 A | 4/2020 |
| CN | 111393611 A | 7/2020 |
| CN | 114015036 A | 2/2022 |

OTHER PUBLICATIONS

1st Office Action of counterpart Chinese Patent Application No. 202310555315.1 issued on Oct. 12, 2023.
First Search Report of counterpart Chinese Patent Application No. 202310555315.1 issued on Oct. 12, 2023.

LOW-VISCOSITY SILANE-TERMINATED RESIN FOR SEALANT AND PREPARATION METHOD THEREOF

CROSS-REFERENCE TO RELATED APPLICATION

The present application claims priority from Chinese Patent Application No. 202310555315.1 filed on May 17, 2023, the contents of which are incorporated herein by reference in their entirety.

TECHNICAL FIELD

The present application relates to the technical field of sealants, in particular to a low-viscosity silane-terminated resin for a sealant and a preparation method thereof.

BACKGROUND

Sealants are an indispensable material now in many fields, such as construction and transportation. With the exploded development of prefabricated buildings, people pay more and more attentions to the sealant, and its performance requirements are also increased. Existing sealant products on the market are mainly silicones, polyurethane, and silane-modified sealants. Herein, a silane-terminated resin has the flexibility and low temperature resistance of polyethers, as well as the good moisture curing and bonding properties of siloxanes, and it has the advantages and good qualities of both silicone sealant and polyurethane sealant, and shows excellent weather resistance, bonding property, finishing property, and deformation displacement resistance, so that it stands out among the three. However, due to the high viscosity property of the silane-terminated resins in existing technologies, it is not possible to reduce the cost of the sealant by increasing the addition amount of calcium carbonate when a sealant formula containing these silane-terminated resins is adjusted.

In order to solve the problem of excessive viscosity of the silane-terminated resin, the viscosity of the sealant is generally reduced by adding a plasticizer. In existing technologies, the silane-terminated resin is also modified in order to reduce the viscosity of the silane-terminated resin. For example, a Chinese patent CN104212046A provides a preparation method for a low-viscosity silane-modified polymer resin, and it includes the following steps: two or more materials are taken and polymerized at a temperature of 10-100 degrees to generate raw materials; the two or more raw materials mentioned above are taken and mixed in proportion to obtain silane-modified polymer resins with different properties; the silane-modified resin is obtained by a polymerizing and mixing method, thereby the purpose of effectively regulating the mechanical properties and temperature resistance of the resin may be achieved. Chinese patents CN103080175A and CN1037041A both achieve the purpose of reducing viscosity by adding a composition of relatively low-molecular-weight substances. The above methods all involve mixing a certain amount of a micromolecular substance into a macro-molecular substance, but the addition of non-active micro-molecules may reduce the strength of the sealant product itself, while the addition of active molecules may reduce the tensile performance of the sealant product.

Therefore, it is very necessary to develop a silane-terminated resin for a sealant that may reduce the viscosity from the internal structure of molecules and a preparation method thereof.

SUMMARY

In order to overcome the deficiencies of existing technologies, a purpose of the present application is to provide a low-viscosity silane-terminated resin for a sealant, and the silane-terminated resin is plasticized within a molecule by introducing a short chain segment, so that its molecular chain becomes flexible and is easy to move, thus the purpose of reducing viscosity is achieved.

In order to solve the above problem, a technical scheme adopted by the present application is as follows.

A low-viscosity silane-terminated resin for a sealant, its structural formula is as follows:

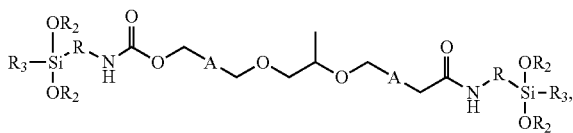

Herein, "-----" is a repeated unit of

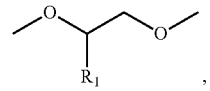

and the number of the repeated units is ≥172; R is $C_nH_{2n}$, n=1~5; $R_1$ is a straight chain alkyl $C_mH_{2m+1}$, m≥1, and the mass ratio of $R_1$ as a methyl in the repeated unit is 50~90%; $R_2$ is $CH_3$ or $CH_2CH_3$; and $R_3$ is $OR_2$ or $R_2$.

As a preferred implementation mode of the present application, the number average molecular weight of the silane-terminated resin is approximately 15000-3000.

A second purpose of the present application is to provide a preparation method for the above low-viscosity silane-terminated resin for the sealant, and it includes the following steps.

S1, 1 part of alcohol initiator and alkaline metal is added to a reaction kettle, the temperature is raised to 75~150° C. after nitrogen replacement, 7.5~14.5 parts of epoxy alkane are added, the pressure is controlled to be 0.0~0.4 Mpa, it is cured until the pressure is no longer decreased, and it is cooled to 90~115° C., and it is degassed, and refined, to obtain a low-molecular-weight polymer.

S2, 1 part of the low-molecular-weight polymer prepared in the Step S1 and 5-15 ppm of a polymetallic cyanide catalyst by total mass are added to the reaction kettle, the temperature is raised to 120~130° C. after the nitrogen replacement, it is dehydrated, then the temperature is raised to 130~140° C., 250~355 parts of the epoxy alkane are added, the pressure is controlled to be 0.0~0.4 Mpa, it is cured until the pressure is no longer decreased, and it is cooled, degassed, and discharged, to obtain a high-molecular-weight polymer resin.

S3, carboxylate metal and isocyanate silane are added to the high-molecular-weight polymer resin prepared in the Step S2 for a reaction, during the reaction, a reaction mixture is taken for an infrared characteristic peak test, and the reaction is ended when there is no longer an isocyanate infrared characteristic peak in the reaction mixture, to obtain the silane-terminated resin.

As a preferred implementation mode of the present application, the alcohol initiator in the Step S1 is short chain diol, preferably one of propylene glycol, isobutylene glycol, or D-1,3-butanediol; and the alkaline metal is K or Na.

As a preferred implementation mode of the present application, the epoxy alkanes in the Steps S1 and S2 are a mixture of epoxy propane and one of epoxy butane, epoxy hexane, epoxy pentane, and epoxy heptane. Preferably, the mixing molar ratio of the epoxy propane to other epoxy alkanes in the epoxy alkane mixture is 1:1~10:1; and further preferably, the mixing molar ratio of the epoxy propane to other epoxy alkanes in the epoxy alkane mixture is 5:1~10:1.

As a preferred implementation mode of the present application, the number average molecular weight of the low-molecular-weight polymer prepared in the Step S1 is 400-800.

As a preferred implementation mode of the present application, metal ions contained in the polymetallic cyanide catalyst in the Step S2 are at least two of Co, Zn, and Pb.

As a preferred implementation mode of the present application, the dehydration time in the Step S2 is 30-90 min, the curing temperature is 130~150° C., and it is degassed and discharged after being cooled to 90~110° C.

As a preferred implementation mode of the present application, in the Step S2, 10~30 g of the epoxy alkane is firstly added, the pressure is controlled to be 0.2~0.9 Mpa, and the remaining epoxy alkane is added after the pressure is decreased significantly.

As a preferred implementation mode of the present application, the number average molecular weight of the high-molecular-weight polymer resin is 15000~30000.

As a preferred implementation mode of the present application, the times of the nitrogen replacement in the Steps S1 and S2 are both 3 or more.

As a preferred implementation mode of the present application, the addition amount of the carboxylate metal in the Step S3 is 0.05~0.15% of the total feeding amount; and the carboxylate metal is an organic tin carboxylate catalyst, an organic bismuth carboxylate catalyst, an organic cobalt carboxylate catalyst, or an organic zinc carboxylate catalyst.

As a preferred implementation mode of the present application, the mass ratio of the hydroxyl value of the high-molecular-weight polymer resin to NCO of the isocyanate silane in the Step S3 is OH:NCO=0.98~1.02:1.

As a preferred implementation mode of the present application, the reaction temperature in the Step S3 is 40~100° C., and the reaction time is 2~10 h.

Compared to the existing technologies, the beneficial effects of the present application are as follows.

The present application firstly uses the alcohol initiator, the alkaline metal and the epoxy alkane to synthesize the low-molecular-weight polymer, then adds the polymetallic cyanide catalyst and the epoxy alkane to synthesize the high-molecular-weight polymer, and finally adds the carboxylate metal and isocyanate silane to react to obtain the silane-terminated resin. A short chain segment is successfully introduced into a molecule, and an original molecular crystal is destroyed, to achieve intramolecular plasticization, so that its molecular chain becomes flexible and is easy to move, thus the purpose of reducing viscosity is achieved.

BRIEF DESCRIPTION OF THE DRAWINGS

The drawings described herein are used to provide a further understanding of the application, and constitute a part of the application, and the exemplary embodiments of the application and the description thereof are intended to explain the application and do not constitute an undue limitation on the application.

DETAILED DESCRIPTION OF THE EMBODIMENTS

The present application is further described in detail below in combination with specific implementation modes.

A low-viscosity silane-terminated resin for a sealant, its number average molecular weight is approximately 15000-30000, and its structural formula is as follows.

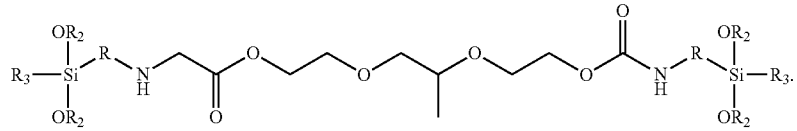

Herein, 'A' is a repeated unit of

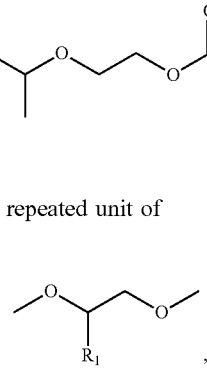

and the number of the repeated units is ≥172;

R is $C_nH_{2n}$, n=1~5; $R_1$ is a straight chain alkyl $C_mH_{2m+1}$, m≥1, and the mass ratio of $R_1$ as a methyl in the repeated unit is 50~90%; $R_2$ is $CH_3$ or $CH_2CH_3$; and $R_3$ is $OR_2$ or $R_2$.

Figure 1:
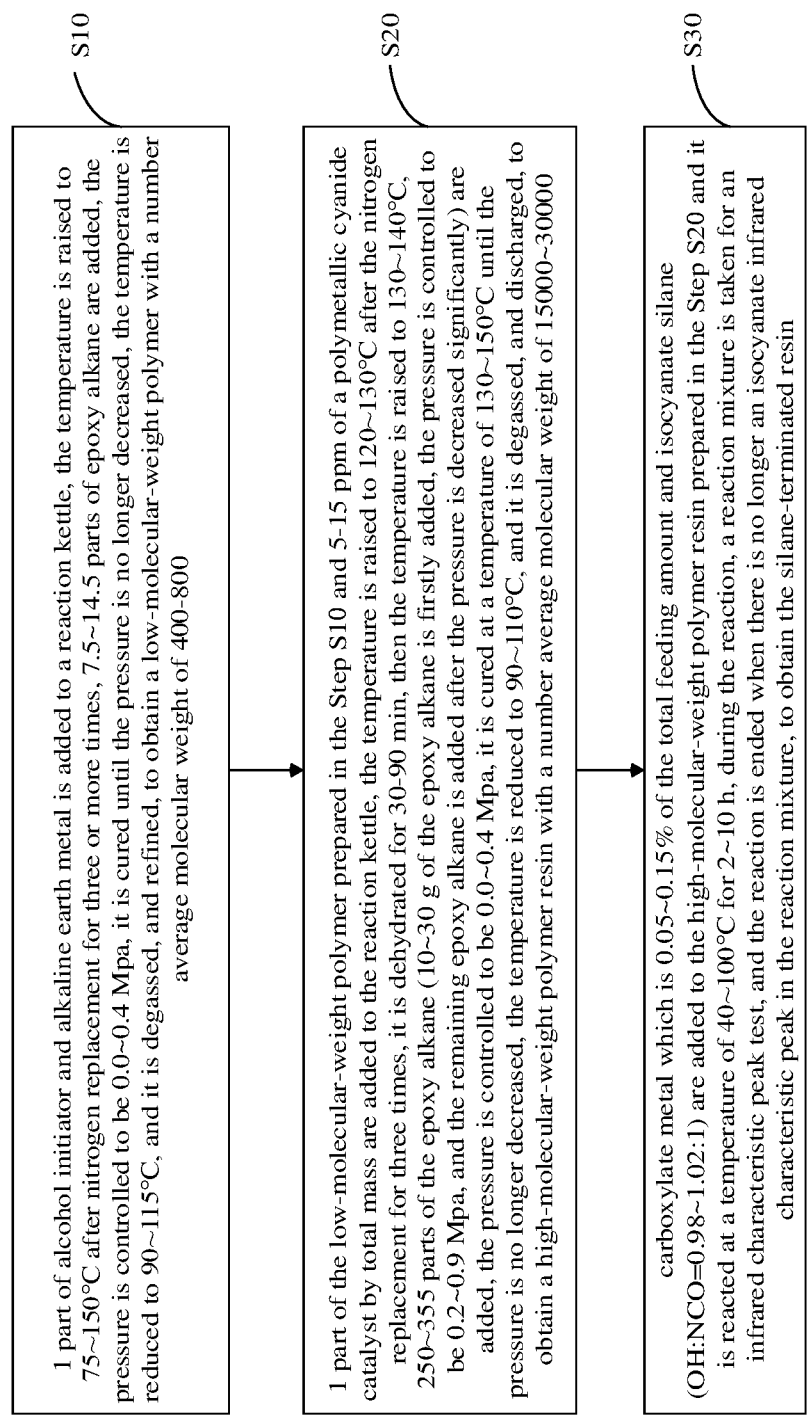
FIG. 1 is a preparation method for a low-viscosity silane-terminated resin for the sealant.

As shown in FIG. 1, a preparation method for the above low-viscosity silane-terminated resin for the sealant, and it includes the following steps.

S10, 1 part of alcohol initiator and alkaline metal is added to a reaction kettle, the temperature is raised to 75~150° C. after nitrogen replacement for three or more times, 7.5~14.5 parts of epoxy alkane are added, the pressure is controlled to be 0.0~0.4 Mpa, it is cured until the pressure is no longer decreased, the temperature is reduced to 90~115° C., and it is degassed, and refined, to obtain a low-molecular-weight polymer with a number average molecular weight of 400-800.

S20, 1 part of the low-molecular-weight polymer prepared in the Step S10 and 5-15 ppm of a polymetallic cyanide catalyst by total mass are added to the reaction kettle, the temperature is raised to 120~130° C. after the nitrogen replacement for three times, it is dehydrated for 30-90 min, then the temperature is raised to 130~140° C., 250~355 parts of the epoxy alkane (10~30 g of the epoxy alkane is firstly added, the pressure is controlled to be 0.2~0.9 Mpa, and the remaining epoxy alkane is added after the pressure is decreased significantly) are added, the pressure is controlled to be 0.0~0.4 Mpa, it is cured at a temperature of 130~150° C. until the pressure is no longer decreased, the temperature is reduced to 90~110° C., and it is degassed, and discharged, to obtain a high-molecular-weight polymer resin with a number average molecular weight of 15000~30000.

S30, carboxylate metal which is 0.05~0.15% of the total feeding amount and isocyanate silane (OH:NCO=0.98~1.02:1) are added to the high-molecular-weight polymer resin prepared in the Step S20 and it is reacted at a temperature of 40~100° C. for 2~10 h, during the reaction, a reaction mixture is taken for an infrared characteristic peak test, and the reaction is ended when there is no longer an isocyanate infrared characteristic peak in the reaction mixture, to obtain the silane-terminated resin.

In the above method, the alcohol initiator in the Step S1 is one of propylene glycol, isobutylene glycol, or D-1,3-butanediol; the alkaline metal is K or Na; the epoxy alkanes in the Steps S1 and S2 are a mixture of epoxy propane and one of epoxy butane, epoxy hexane, epoxy pentane, and epoxy heptane; metal ions contained in the polymetallic cyanide catalyst in the Step S2 are at least two of Co, Zn, and Pb; and the carboxylate metal is an organic tin carboxylate catalyst, an organic bismuth carboxylate catalyst, an organic cobalt carboxylate catalyst, or an organic zinc carboxylate catalyst, such as dibutyltin dilaurate, stannous octoate, or other carboxylate metal catalysts.

Embodiment 1

Figure 2:
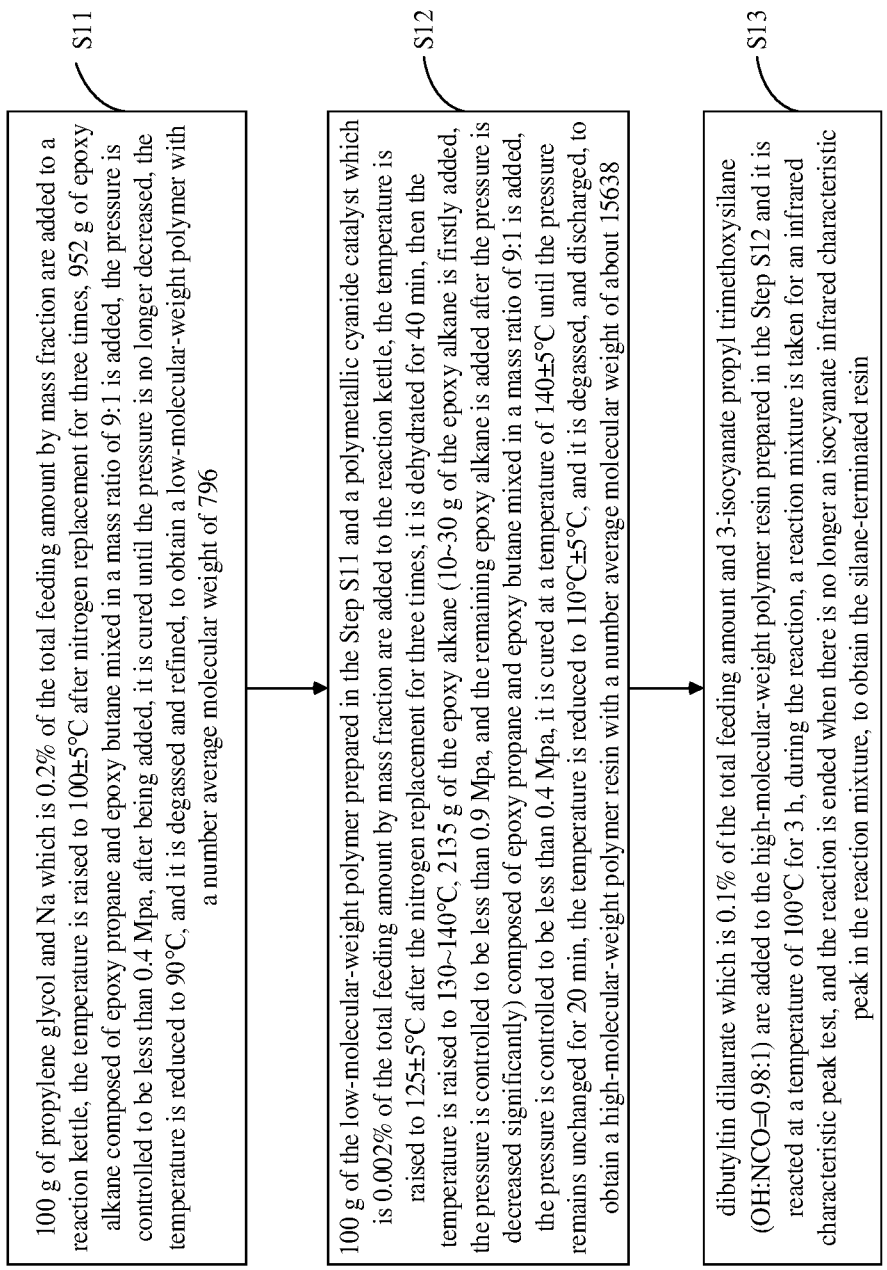
FIG. 2 is a preparation method for a low-viscosity silane-terminated resin for a sealant provided by Embodiment 1.

As shown in FIG. 2, a preparation method for a low-viscosity silane-terminated resin for a sealant, and it includes the following steps.

S11, 100 g of propylene glycol and Na which is 0.2% of the total feeding amount by mass fraction are added to a reaction kettle, the temperature is raised to 100±5° C. after nitrogen replacement for three times, 952 g of epoxy alkane composed of epoxy propane and epoxy butane mixed in a mass ratio of 9:1 is added, the pressure is controlled to be less than 0.4 Mpa, after being added, it is cured until the pressure is no longer decreased, the temperature is reduced to 90° C., and it is degassed and refined, to obtain a low-molecular-weight polymer with a number average molecular weight of 796.

S12, 100 g of the low-molecular-weight polymer prepared in the Step S11 and a polymetallic cyanide catalyst which is 0.002% of the total feeding amount by mass fraction are added to the reaction kettle, the temperature is raised to 125±5° C. after the nitrogen replacement for three times, it is dehydrated for 40 min, then the temperature is raised to 130~140° C., 2135 g of the epoxy alkane (10~30 g of the epoxy alkane is firstly added, the pressure is controlled to be less than 0.9 Mpa, and the remaining epoxy alkane is added after the pressure is decreased significantly) composed of epoxy propane and epoxy butane mixed in a mass ratio of 9:1 is added, the pressure is controlled to be less than 0.4 Mpa, it is cured at a temperature of 140±5° C. until the pressure remains unchanged for 20 min, the temperature is reduced to 110° C.±5° C., and it is degassed, and discharged, to obtain a high-molecular-weight polymer resin with a number average molecular weight of about 15638.

S13, dibutyltin dilaurate which is 0.1% of the total feeding amount and 3-isocyanate propyl trimethoxysilane (OH:NCO=0.98:1) are added to the high-molecular-weight polymer resin prepared in the Step S12 and it is reacted at a temperature of 100° C. for 3 h, during the reaction, a reaction mixture is taken for an infrared characteristic peak test, and the reaction is ended when there is no longer an isocyanate infrared characteristic peak in the reaction mixture, to obtain the silane-terminated resin.

Embodiment 2

Figure 3:
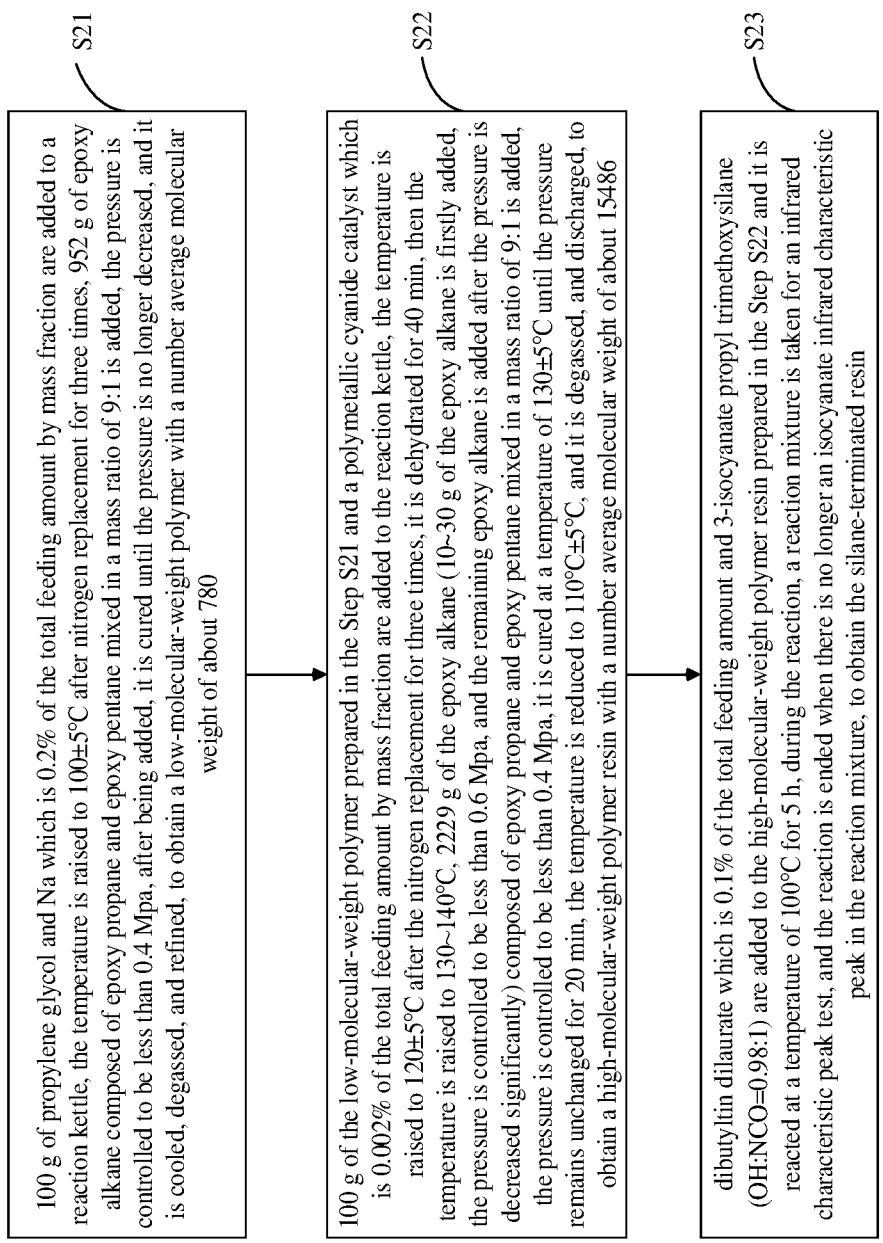
FIG. 3 is a preparation method for a low-viscosity silane-terminated resin for a sealant provided by Embodiment 2.

As shown in FIG. 3, a preparation method for a low-viscosity silane-terminated resin for a sealant, and it includes the following steps.

S21, 100 g of propylene glycol and Na which is 0.2% of the total feeding amount by mass fraction are added to a reaction kettle, the temperature is raised to 100±5° C. after nitrogen replacement for three times, 952 g of epoxy alkane composed of epoxy propane and epoxy pentane mixed in a mass ratio of 9:1 is added, the pressure is controlled to be less than 0.4 Mpa, after being added, it is cured until the pressure is no longer decreased, and it is cooled, degassed, and refined, to obtain a low-molecular-weight polymer with a number average molecular weight of about 780.

S22, 100 g of the low-molecular-weight polymer prepared in the Step S21 and a polymetallic cyanide catalyst which is 0.002% of the total feeding amount by mass fraction are added to the reaction kettle, the temperature is raised to 120±5° C. after the nitrogen replacement for three times, it is dehydrated for 40 min, then the temperature is raised to 130~140° C., 2229 g of the epoxy alkane (10~30 g of the epoxy alkane is firstly added, the pressure is controlled to be less than 0.6 Mpa, and the remaining epoxy alkane is added after the pressure is decreased significantly) composed of epoxy propane and epoxy pentane mixed in a mass ratio of 9:1 is added, the pressure is controlled to be less than 0.4 Mpa, it is cured at a temperature of 130±5° C. until the pressure remains unchanged for 20 min, the temperature is reduced to 110° C.±5° C., and it is degassed, and discharged, to obtain a high-molecular-weight polymer resin with a number average molecular weight of about 15486.

S23, dibutyltin dilaurate which is 0.1% of the total feeding amount and 3-isocyanate propyl trimethoxysilane (OH:NCO=0.98:1) are added to the high-molecular-weight polymer resin prepared in the Step S22 and it is reacted at a temperature of 100° C. for 5 h, during the reaction, a reaction mixture is taken for an infrared characteristic peak test, and the reaction is ended when there is no longer an isocyanate infrared characteristic peak in the reaction mixture, to obtain the silane-terminated resin.

Embodiment 3

Figure 4:
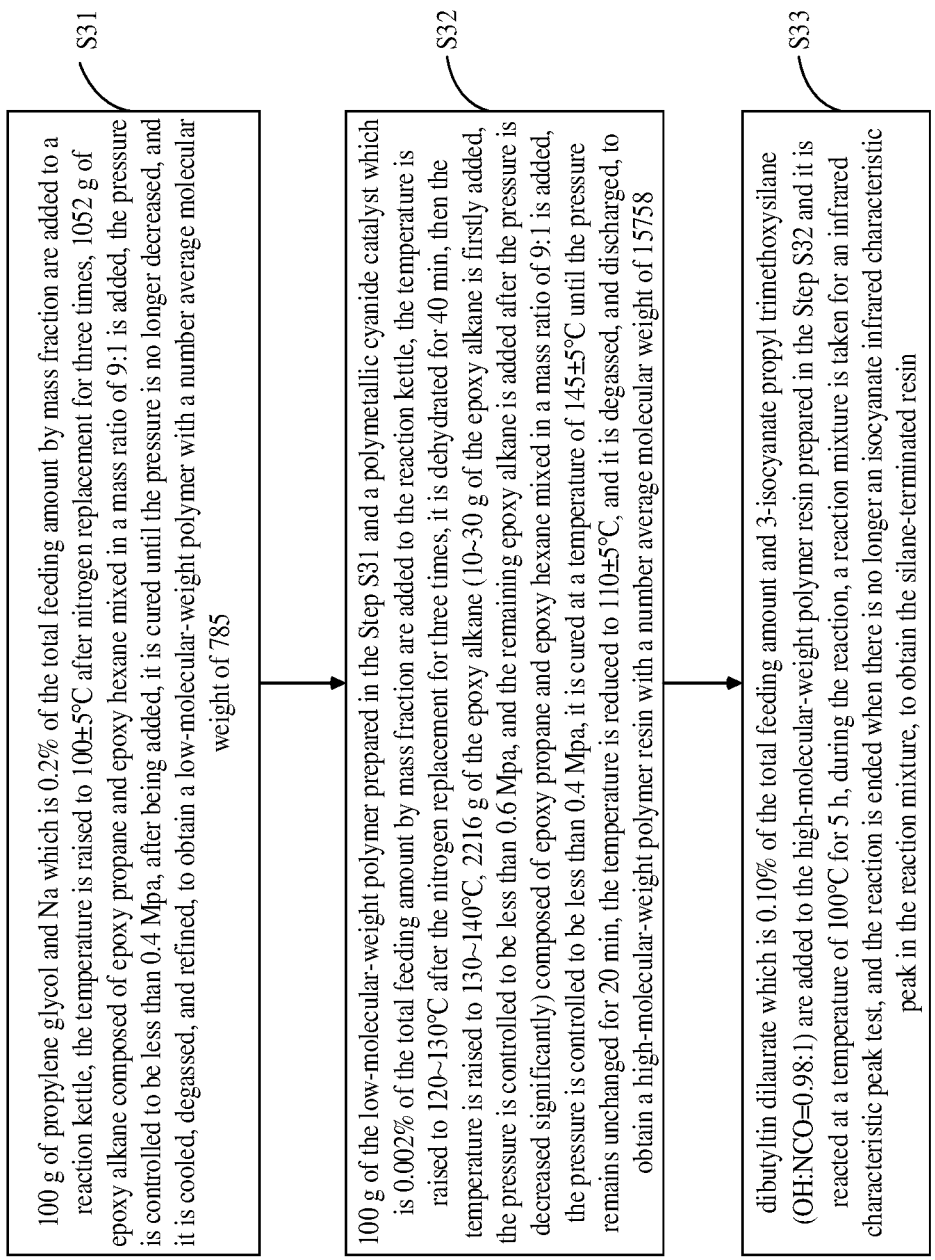
FIG. 4 is a preparation method for a low-viscosity silane-terminated resin for a sealant provided by Embodiment 3.

As shown in FIG. 4, a preparation method for a low-viscosity silane-terminated resin for a sealant, and it includes the following steps.

S31, 100 g of propylene glycol and Na which is 0.2% of the total feeding amount by mass fraction are added to a reaction kettle, the temperature is raised to 100±5° C. after nitrogen replacement for three times, 1052 g of epoxy alkane composed of epoxy propane and epoxy hexane mixed in a mass ratio of 9:1 is added, the pressure is controlled to be less than 0.4 Mpa, after being added, it is cured until the pressure is no longer decreased, and it is cooled, degassed, and refined, to obtain a low-molecular-weight polymer with a number average molecular weight of 785.

S32, 100 g of the low-molecular-weight polymer prepared in the Step S31 and a polymetallic cyanide catalyst which is 0.002% of the total feeding amount by mass fraction are added to the reaction kettle, the temperature is raised to 120~130° C. after the nitrogen replacement for three times, it is dehydrated for 40 min, then the temperature is raised to 130~140° C., 2216 g of the epoxy alkane (10~30 g of the epoxy alkane is firstly added, the pressure is controlled to be less than 0.6 Mpa, and the remaining epoxy alkane is added after the pressure is decreased significantly) composed of epoxy propane and epoxy hexane mixed in a mass ratio of 9:1 is added, the pressure is controlled to be less than 0.4 Mpa, it is cured at a temperature of 145±5° C. until the pressure remains unchanged for 20 min, the temperature is reduced to 110±5° C., and it is degassed, and discharged, to obtain a high-molecular-weight polymer resin with a number average molecular weight of 15758.

S33, dibutyltin dilaurate which is 0.10% of the total feeding amount and 3-isocyanate propyl trimethoxysilane (OH:NCO=0.98:1) are added to the high-molecular-weight polymer resin prepared in the Step S32 and it is reacted at a temperature of 100° C. for 5 h, during the reaction, a reaction mixture is taken for an infrared characteristic peak test, and the reaction is ended when there is no longer an isocyanate infrared characteristic peak in the reaction mixture, to obtain the silane-terminated resin.

Embodiment 4

Figure 5:
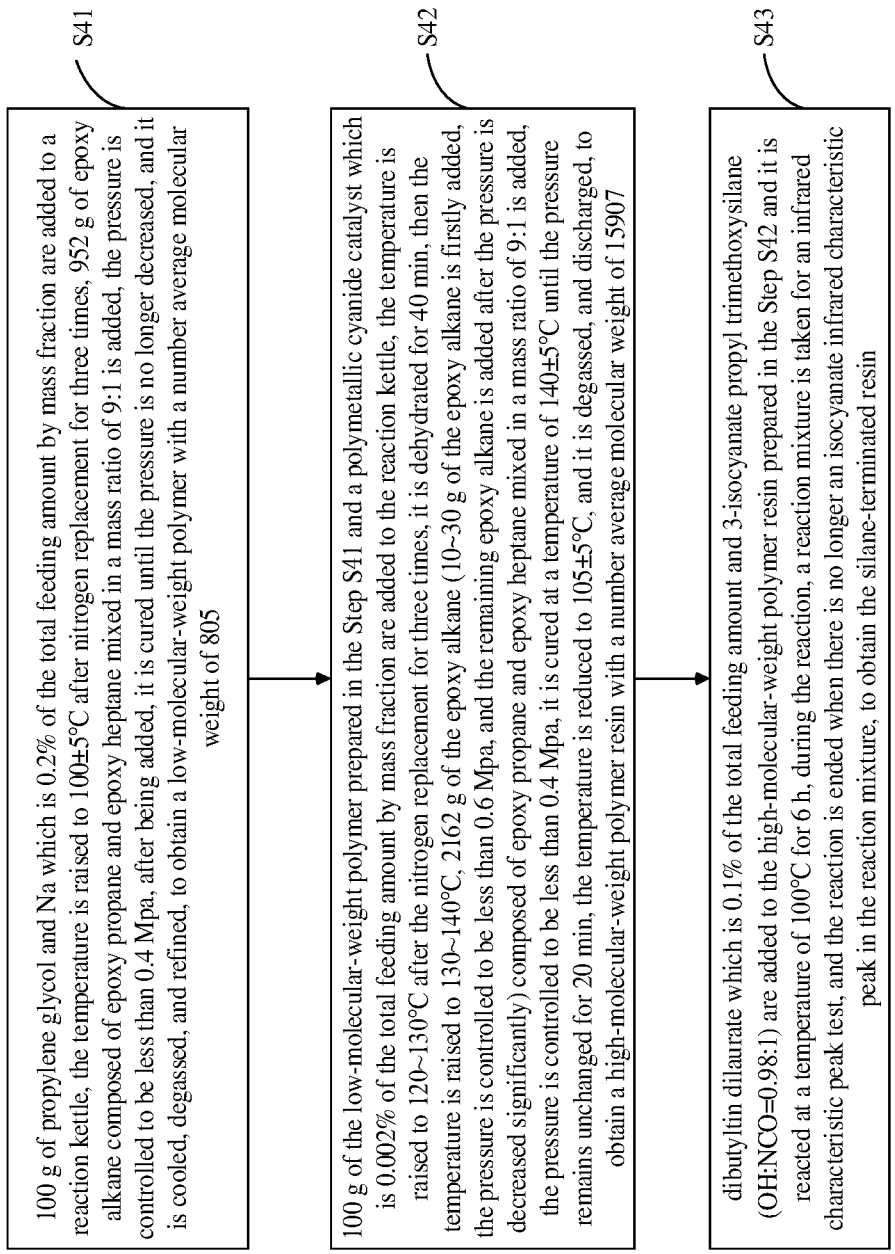
FIG. 5 is a preparation method for a low-viscosity silane-terminated resin for a sealant provided by Embodiment 4.

As shown in FIG. 5, a preparation method for a low-viscosity silane-terminated resin for a sealant, and it includes the following steps.

S41, 100 g of propylene glycol and Na which is 0.2% of the total feeding amount by mass fraction are added to a reaction kettle, the temperature is raised to 100±5° C. after nitrogen replacement for three times, 952 g of epoxy alkane composed of epoxy propane and epoxy heptane mixed in a mass ratio of 9:1 is added, the pressure is controlled to be less than 0.4 Mpa, after being added, it is cured until the pressure is no longer decreased, and it is cooled, degassed, and refined, to obtain a low-molecular-weight polymer with a number average molecular weight of 805.

S42, 100 g of the low-molecular-weight polymer prepared in the Step S41 and a polymetallic cyanide catalyst which is 0.002% of the total feeding amount by mass fraction are added to the reaction kettle, the temperature is raised to 120~130° C. after the nitrogen replacement for three times, it is dehydrated for 40 min, then the temperature is raised to 130~140° C., 2162 g of the epoxy alkane (10~30 g of the epoxy alkane is firstly added, the pressure is controlled to be less than 0.6 Mpa, and the remaining epoxy alkane is added after the pressure is decreased significantly) composed of epoxy propane and epoxy heptane mixed in a mass ratio of 9:1 is added, the pressure is controlled to be less than 0.4 Mpa, it is cured at a temperature of 140±5° C. until the pressure remains unchanged for 20 min, the temperature is reduced to 105±5° C., and it is degassed, and discharged, to obtain a high-molecular-weight polymer resin with a number average molecular weight of 15907.

S43, dibutyltin dilaurate which is 0.1% of the total feeding amount and 3-isocyanate propyl trimethoxysilane (OH:NCO=0.98:1) are added to the high-molecular-weight polymer resin prepared in the Step S42 and it is reacted at a temperature of 100° C. for 6 h, during the reaction, a reaction mixture is taken for an infrared characteristic peak test, and the reaction is ended when there is no longer an isocyanate infrared characteristic peak in the reaction mixture, to obtain the silane-terminated resin.

Contrast Example 1

Figure 6:
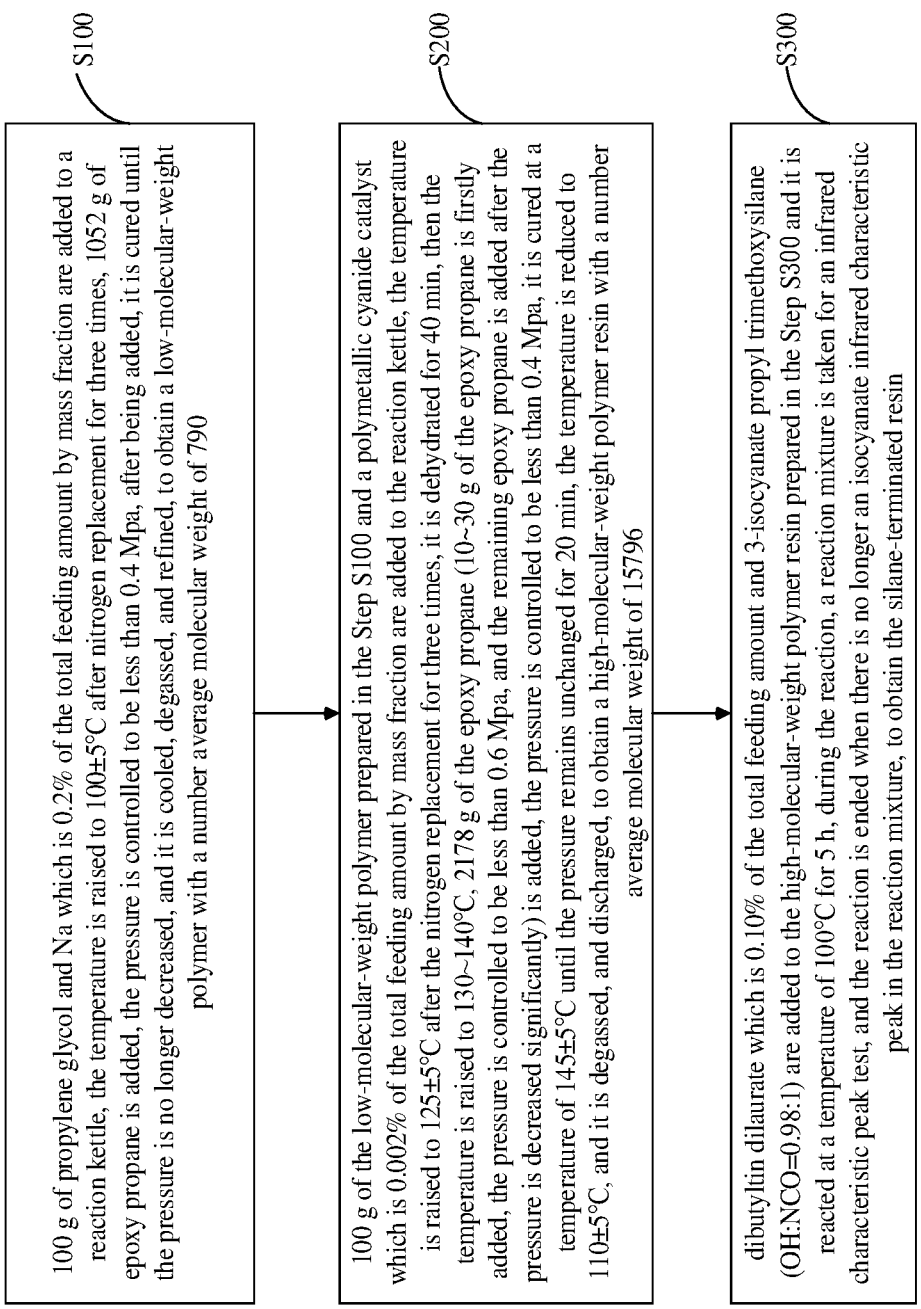
FIG. 6 is a preparation method for a low-viscosity silane-terminated resin for a sealant provided by Contrast example 1.

As shown in FIG. 6, a preparation method for a silane-terminated resin, and it includes the following steps:

S100, 100 g of propylene glycol and Na which is 0.2% of the total feeding amount by mass fraction are added to a reaction kettle, the temperature is raised to 100±5° C. after nitrogen replacement for three times, 1052 g of epoxy propane is added, the pressure is controlled to be less than 0.4 Mpa, after being added, it is cured until the pressure is no longer decreased, and it is cooled, degassed, and refined, to obtain a low-molecular-weight polymer with a number average molecular weight of 790.

S200, 100 g of the low-molecular-weight polymer prepared in the Step S100 and a polymetallic cyanide catalyst which is 0.002% of the total feeding amount by mass fraction are added to the reaction kettle, the temperature is raised to 125±5° C. after the nitrogen replacement for three times, it is dehydrated for 40 min, then the temperature is raised to 130~140° C., 2178 g of the epoxy propane (10~30 g of the epoxy propane is firstly added, the pressure is controlled to be less than 0.6 Mpa, and the remaining epoxy propane is added after the pressure is decreased significantly) is added, the pressure is controlled to be less than 0.4 Mpa, it is cured at a temperature of 145±5° C. until the pressure remains unchanged for 20 min, the temperature is reduced to 110±5° C., and it is degassed, and discharged, to obtain a high-molecular-weight polymer resin with a number average molecular weight of 15796.

S300, dibutyltin dilaurate which is 0.10% of the total feeding amount and 3-isocyanate propyl trimethoxysilane (OH:NCO=0.98:1) are added to the high-molecular-weight polymer resin prepared in the Step S200 and it is reacted at a temperature of 100° C. for 5 h, during the reaction, a reaction mixture is taken for an infrared characteristic peak test, and the reaction is ended when there is no longer an isocyanate infrared characteristic peak in the reaction mixture, to obtain the silane-terminated resin.

Liquid phase analysis is performed on the products obtained from Embodiments 1~4 and Contrast example 1, and results are shown in Table 1:

TABLE 1

Liquid phase analysis results of products obtained from Embodiments 1~4 and Contrast example 1

| Item | Mn | Mw | D | Mp | Dynamic viscosity (mpa · s, 25° C.) |
|---|---|---|---|---|---|
| Embodiment 1 | 15638 | 17019 | 1.088 | 15732 | 28000 |
| Embodiment 2 | 15486 | 16818 | 1.086 | 15151 | 26600 |
| Embodiment 3 | 15758 | 17145 | 1.088 | 15340 | 23500 |
| Embodiment 4 | 15907 | 17280 | 1.086 | 15467 | 23100 |
| Contrast example 1 | 15796 | 17170 | 1.087 | 15464 | 32600 |

From Table 1, it may be seen that the main chain of Contrast example 1 is a polyoxypropylene ether chain, and the dynamic viscosity is 32600 mpa·s at 25° C., which is far higher than the dynamic viscosities of Embodiments 1~4. It is indicated that the alkyl chain of R1 added to the chain segment in the present application is longer, and the viscosity of the product is lower, which shows the molecular chain segment becomes flexible, and is easy to move.

Embodiment 5

Figure 7:
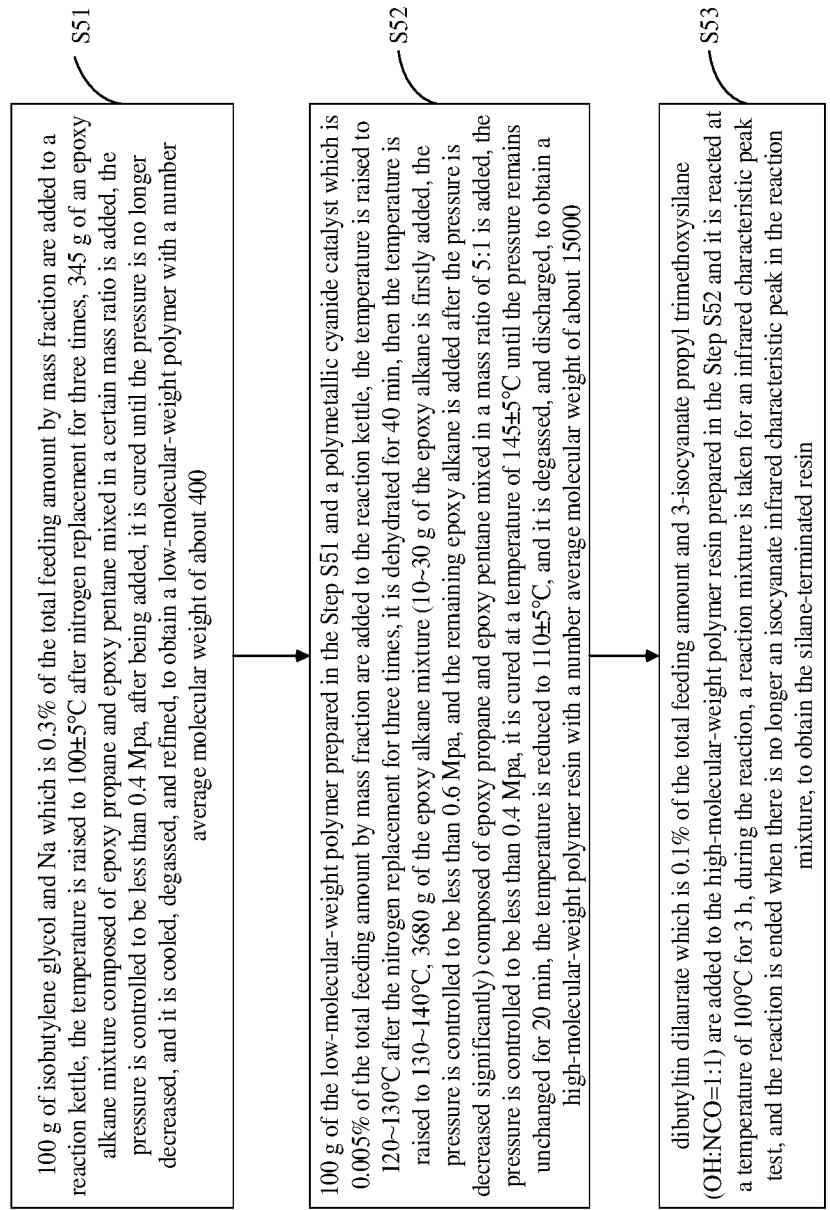
FIG. 7 is a preparation method for a low-viscosity silane-terminated resin for a sealant provided by Embodiment 5.

As shown in FIG. 7, a preparation method for a low-viscosity silane-terminated resin for a sealant, and it includes the following steps.

S51, 100 g of isobutylene glycol and Na which is 0.3% of the total feeding amount by mass fraction are added to a reaction kettle, the temperature is raised to 100±5° C. after nitrogen replacement for three times, 345 g of an epoxy alkane mixture composed of epoxy propane and epoxy pentane mixed in a certain mass ratio is added, the pressure is controlled to be less than 0.4 Mpa, after being added, it is cured until the pressure is no longer decreased, and it is cooled, degassed, and refined, to obtain a low-molecular-weight polymer with a number average molecular weight of about 400.

S52, 100 g of the low-molecular-weight polymer prepared in the Step S51 and a polymetallic cyanide catalyst which is 0.005% of the total feeding amount by mass fraction are added to the reaction kettle, the temperature is raised to 120~130° C. after the nitrogen replacement for three times, it is dehydrated for 40 min, then the temperature is raised to 130~140° C., 3680 g of the epoxy alkane mixture (10~30 g of the epoxy alkane is firstly added, the pressure is controlled to be less than 0.6 Mpa, and the remaining epoxy alkane is added after the pressure is decreased significantly) composed of epoxy propane and epoxy pentane mixed in a mass ratio of 5:1 is added, the pressure is controlled to be less than 0.4 Mpa, it is cured at a temperature of 145±5° C. until the pressure remains unchanged for 20 min, the temperature is reduced to 110±5° C., and it is degassed, and discharged, to obtain a high-molecular-weight polymer resin with a number average molecular weight of about 15000.

S53, dibutyltin dilaurate which is 0.1% of the total feeding amount and 3-isocyanate propyl trimethoxysilane (OH:NCO=1:1) are added to the high-molecular-weight polymer resin prepared in the Step S52 and it is reacted at a temperature of 100° C. for 3 h, during the reaction, a reaction mixture is taken for an infrared characteristic peak test, and the reaction is ended when there is no longer an isocyanate infrared characteristic peak in the reaction mixture, to obtain the silane-terminated resin.

Embodiment 6

The difference between this embodiment and Embodiment 5 is only that: 3680 g of an epoxy alkane mixture composed of epoxy propane and epoxy pentane mixed in a mass ratio of 6:1 is added.

Embodiment 7

The difference between this embodiment and Embodiment 5 is only that: 3680 g of an epoxy alkane mixture composed of epoxy propane and epoxy pentane mixed in a mass ratio of 7:1 is added.

Embodiment 8

The difference between this embodiment and Embodiment 5 is only that: 3680 g of an epoxy alkane mixture composed of epoxy propane and epoxy pentane mixed in a mass ratio of 8:1 is added.

Contrast Example 2

The difference between this contrast example and Embodiment 5 is only that: 3680 g of epoxy propane is added.

Liquid phase analysis is performed on the products obtained from Embodiments 5~8 and Contrast example 2, and results are shown in Table 2:

TABLE 2

Liquid phase analysis results of products prepared under different mixing ratios of epoxy propane and epoxy pentane

| Item | Epoxy propane:epoxy pentane | Mn | Mw | D | Mp | Dynamic viscosity (mpa · s, 25° C.) |
|---|---|---|---|---|---|---|
| Embodiment 5 | 5:1 | 14438 | 15810 | 1.101 | 14132 | 19650 |
| Embodiment 6 | 6:1 | 14686 | 16038 | 1.092 | 14367 | 20600 |
| Embodiment 7 | 7:1 | 14788 | 16089 | 1.088 | 14458 | 22500 |
| Embodiment 8 | 8:1 | 14887 | 16168 | 1.086 | 14571 | 25100 |
| Contrast example 2 | 10:0 | 15096 | 16395 | 1.086 | 14725 | 28600 |

From Table 2, it may be seen that the viscosity of the product is decreased with the increase of the flexible chain segment. When the ratio of the epoxy propane to the epoxy pentane is 5:1, the viscosity of the product is not decreased much. This is because: as the epoxy pentane is increased, the addition becomes difficult, and the molecular distribution coefficient reaches 1.101. The molecular distribution is widened, so that the resin viscosity is increased.

Embodiment 9

Figure 8:
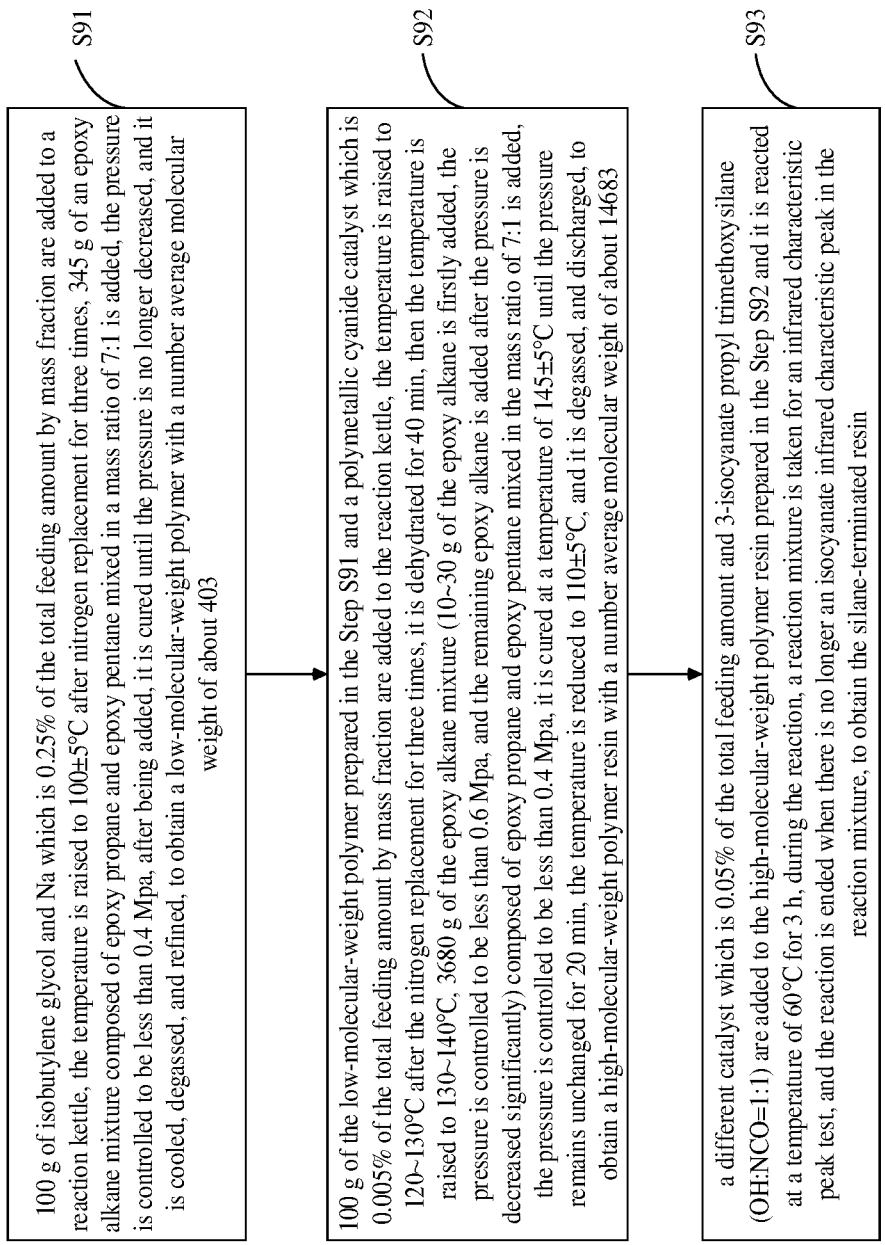
FIG. 8 is a preparation method for a low-viscosity silane-terminated resin for a sealant provided by Embodiment 9.

As shown in FIG. 8, a preparation method for a low-viscosity silane-terminated resin for a sealant, and it includes the following steps.

S91, 100 g of isobutylene glycol and Na which is 0.25% of the total feeding amount by mass fraction are added to a reaction kettle, the temperature is raised to 100±5° C. after nitrogen replacement for three times, 345 g of an epoxy alkane mixture composed of epoxy propane and epoxy pentane mixed in a mass ratio of 7:1 is added, the pressure is controlled to be less than 0.4 Mpa, after being added, it is cured until the pressure is no longer decreased, and it is cooled, degassed, and refined, to obtain a low-molecular-weight polymer with a number average molecular weight of about 403.

S92, 100 g of the low-molecular-weight polymer prepared in the Step S91 and a polymetallic cyanide catalyst which is 0.005% of the total feeding amount by mass fraction are added to the reaction kettle, the temperature is raised to 120~130° C. after the nitrogen replacement for three times, it is dehydrated for 40 min, then the temperature is raised to 130~140° C., 3680 g of the epoxy alkane mixture (10~30 g of the epoxy alkane is firstly added, the pressure is controlled to be less than 0.6 Mpa, and the remaining epoxy alkane is added after the pressure is decreased significantly) composed of epoxy propane and epoxy pentane mixed in the mass ratio of 7:1 is added, the pressure is controlled to be less than 0.4 Mpa, it is cured at a temperature of 145±5° C. until the pressure remains unchanged for 20 min, the temperature is reduced to 110±5° C., and it is degassed, and discharged, to obtain a high-molecular-weight polymer resin with a number average molecular weight of about 14683.

S93, a different catalyst which is 0.05% of the total feeding amount and 3-isocyanate propyl trimethoxysilane (OH:NCO=1:1) are added to the high-molecular-weight polymer resin prepared in the Step S92 and it is reacted at a temperature of 60° C. for 3 h, during the reaction, a reaction mixture is taken for an infrared characteristic peak test, and the reaction is ended when there is no longer an isocyanate infrared characteristic peak in the reaction mixture, to obtain the silane-terminated resin.

TABLE 3

Liquid phase analysis results of products prepared with different catalyst types in S3 stage

| Item | Catalyst | Dynamic viscosity (mpa · s, 25° C.) | S3 stage reaction reaction time |
|---|---|---|---|
| Embodiment 9.1 | Organic tin | 23600 | 2.0 |
| Embodiment 9.2 | Organic bismuth | 21600 | 5.0 |
| Embodiment 9.3 | Organic zinc | 22300 | 6.0 |
| Embodiment 9.4 | Composite organic bismuth and tin | 24100 | 2.5 |
| Embodiment 9.5 | Composite organic bismuth and zinc | 21600 | 3.5 |

From Table 3, it may be seen that the viscosity of the product is based on the same high-molecular polymer resin prepared in S1 and S2, and in S3, the viscosity difference between the different catalysts used for silane terminating is relatively small. However, due to the different catalytic efficiencies of the different metal catalysts, the reaction times may be different, and the different catalysts may be selected according to different operating conditions.

Application Embodiment 1

The silane-terminated resins obtained from Embodiments 1~4 and Contrast example 1, Embodiments 5~8 and Contrast example 2 are respectively applied to a sealant, and the sealant is prepared by using the same method. The formula of the sealant consists of the following components calculated by mass percentage:

| | |
|---|---|
| Silane-terminated resin | 18% |
| Filler | 50.2% |
| Plasticizer | 25% |
| Thixotropic agent | 1.2% |
| Stabilizer | 0.6% |
| Silane additive | 4.5% |
| Catalyst | 0.5% |

In the above formula, the filler is a mixture of nano-calcium carbonate and ground calcium carbonate in a mass ratio of 2:1; the plasticizer is diisononyl phthalate (DINP); the thixotropic agent is a polyamide wax; the stabilizer is a mixture of antioxidant 1076 and light stabilizer in a mass ratio of 1:1, and the light stabilizer is a light stabilizer commonly used on the market; the silane additive is a mixture of vinyl trimethoxysilane (the amount is 2%) and KH792 (the amount is 2.5%); and the catalyst is dibutylene dilaurate.

The extrudability, tensile property, tear strength and other properties of the obtained sealant are measured, and results are shown in Tables 3 and 4.

TABLE 3

Property data of sealants prepared by using silane-terminated resins in Embodiments 1~4 and Contrast example 1

| Test item | Test condition | Test parameter | Unit | Embodiment 1 | Embodiment 2 | Embodiment 3 | Embodiment 4 | Contrast example 1 |
|---|---|---|---|---|---|---|---|---|
| Extrudability | 23° C. 50% Humidity | 0.35 MPa | g/15 s | 267 | 325 | 368 | 402 | 132 |
| Hardness | Room temperature Curing for 7 days | Shore A hardness | | 40 | 39 | 39 | 38 | 41 |
| Tensile property | Room temperature Curing for 7 days | Tensile strength | MPa | 2.88 | 2.51 | 2.42 | 2.21 | 2.90 |
| | | 50% elongation Transient stress | | | 0.56 | 0.58 | 0.62 | 0.65 | 0.53 |
| | | Elongation at break | % | 795 | 696 | 864 | 962 | 520 |
| Tear strength | Room temperature Curing for 7 days | | kN/m | 17.1 | 17.9 | 18.2 | 18.6 | 15.6 |
| Bonding property | Room temperature Curing for 7 days | Aluminum sheet | AFb | CF | CF | CF | CF | CF |
| | | Glass sheet | CFc | CF | CF | CF | CF | CF |
| Peeling test pieces | | Polyamide plastic | | CF | CF | CF | CF | CF |

From Table 3, it may be seen that the extrudability of Embodiments 1~4 is significantly increased compared to Contrast example 1, it is indicated that the flowability of the silane-terminated resin products prepared in Embodiments 1~4 is increased in the application process, and the elongation and tear strength are both increased. It is indicated that the internal flexibility of the silane-terminated resin molecule is increased, and the tensile strength is increased in the application process, thereby the bonding mechanical property of the silane-terminated resin is improved in the application process.

TABLE 4

Property data of sealants prepared by using silane-terminated resins in Embodiments 5~8 and Contrast example 2

| Test item | Test condition | Test parameter | Unit | Embodiment 5 | Embodiment 6 | Embodiment 7 | Embodiment 8 | Contrast example 2 |
|---|---|---|---|---|---|---|---|---|
| Extrudability | 23° C., 50% Humidity | 0.35 MPa | g/15 s | 510 | 498 | 425 | 405 | 302 |
| Hardness | Room temperature Curing for 7 days | Shore A hardness | | 45 | 44 | 44 | 42 | 45 |
| Tensile property | Room temperature Curing for 7 days | Tensile strength | MPa | 0.78 | 0.77 | 0.70 | 0.67 | 0.60 |
| | | Elongation at break | % | 575 | 568 | 410 | 398 | 308 |
| Tear strength | Room temperature Curing for 7 days | | kN/m | 19.8 | 19.6 | 18.2 | 18.0 | 14.8 |
| Bonding property Peeling test pieces | Room temperature Curing for 7 days | Aluminum sheet | AFb CFc | CF | CF | CF | CF | CF |
| | | Glass sheet | | CF | CF | CF | CF | CF |
| | | Polyamide plastic | | CF | CF | CF | CF | CF |

From Table 4, it may be seen that the extrudability of the silane-terminated resins in Embodiments 5~8 is improved with the increase of epoxy pentane amount. The extrudability of the silane-terminated resin prepared by using the pure epoxy propane in Contrast example 2 is only 302 g/15 s, the breaking strength is 0.60 MPa, the elongation is decreased to 308%, and the tear strength is 14.8 kN/m, which is significantly lower than the silane-terminated resin with the high branching degree in the polyether segment of Embodiments 5~8.

The above implementation modes are only preferred implementation modes of the present application, and may not be used to limit the scope of protection of the present application. Any non-substantive changes and replacements made by those skilled in the art based on the present application belong to the scope of protection claimed by the present application.

What is claimed is:

1. A preparation method for a low-viscosity silane-terminated resin for a sealant, comprising the following steps:

S1, adding 1 part by weight of alcohol initiator and alkali metal to a reaction kettle, raising the temperature to 75~150° C. after replacing air in the reaction kettle with nitrogen, adding 7.5~14.5 parts by weight of epoxy alkane, controlling the pressure to be 0.0~0.4 MPa, curing until the pressure is no longer decreased, cooling, degassing, and refining, to obtain a low-molecular-weight polymer;

S2, adding 1 part by weight of the low-molecular-weight polymer prepared in the Step S1 and 5-15 ppm of a polymetallic cyanide catalyst by total mass to the reaction kettle, raising the temperature to 120~130° C. after replacing air in the reaction kettle with nitrogen, dehydrating, then raising the temperature to 130~140° C., adding 250~355 parts by weight of the epoxy alkane, controlling the pressure to be 0.0~0.4 MPa, curing until the pressure is no longer decreased, cooling, degassing, and discharging, to obtain a high-molecular-weight polymer resin; and S3, adding organic tin catalyst and isocyanate silane to the high-molecular-weight polymer resin prepared in the Step S2 for a reaction, during the reaction, taking a reaction mixture for an infrared characteristic peak test, and ending the reaction when there is no longer an isocyanate infrared characteristic peak in the reaction mixture, to obtain the silane-terminated resin;

the structural formula of the silane-terminated resin is as follows:

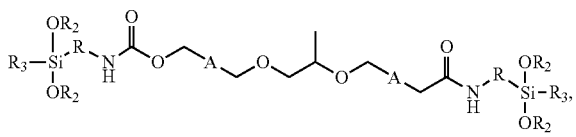

wherein, 'A' is —(CHR$_1$—CH$_2$—O—)$_x$-CHR$_1$—, wherein x≥172; R being C$_n$H$_{2n}$, n=1~5; R$_1$ being a straight chain alkyl C$_m$H$_{2m+1}$, m≥1, and the mass ratio of R$_1$ as a methyl in the repeated unit being 50~90%; R$_2$ being CH$_3$ or CH$_2$CH$_3$; and R$_3$ being OR$_2$ or R$_2$; the number average molecular weight of the silane-terminated resin is about 15000-30000.

2. The preparation method for the low-viscosity silane-terminated resin for the sealant according to claim 1, wherein the alcohol initiator in the Step S1 is propylene glycol; the alkali metal is K or Na; the epoxy alkanes in the Steps S1 and S2 are a mixture of epoxy propane and one of epoxy butane, epoxy hexane, epoxy pentane, and epoxy heptane.

3. The preparation method for the low-viscosity silane-terminated resin for the sealant according to claim 2, wherein the mixing molar ratio of the epoxy propane to other epoxy alkanes in the epoxy alkane mixture is 1:1~10:1.

4. The preparation method for the low-viscosity silane-terminated resin for the sealant according to claim 1, wherein the number average molecular weight of the low-molecular-weight polymer prepared in the Step S1 is 400-800.

5. The preparation method for the low-viscosity silane-terminated resin for the sealant according to claim 1, wherein metal ions contained in the polymetallic cyanide catalyst in the Step S2 are at least two of Co, Zn, and Pb.

6. The preparation method for the low-viscosity silane-terminated resin for the sealant according to claim 1, wherein the dehydration time in the Step S2 is 30-90 min, the curing temperature is 130~150° C., and it is degassed and discharged after being cooled to 90~110° C.

7. The preparation method for the low-viscosity silane-terminated resin for the sealant according to claim 1, wherein the addition amount of the organic tin catalyst in the Step S3 is 0.05~0.15% by weight of the total feeding amount; the organic tin catalyst is a dibutyltin dilaurate or dioctyltin dilaurate; and the mass ratio of the hydroxyl value of the high-molecular-weight polymer resin to NCO of the isocyanate silane in the Step S3 is OH:NCO=0.98~1.02:1.

8. The preparation method for the low-viscosity silane-terminated resin for the sealant according to claim 1, wherein the reaction temperature in the Step S3 is 40~100° C., and the reaction time is 2~10 h.

* * * * *